United States Patent [19]

Blodgett

[11] 4,298,081

[45] Nov. 3, 1981

[54] DIFFERENTIAL WEIGHING SYSTEM PROVIDING IMPROVED SIGNAL TO NOISE RATIO

[76] Inventor: Stewart B. Blodgett, 6119 Jessamine St., Houston, Tex. 77081

[21] Appl. No.: 153,591

[22] Filed: May 27, 1980

[51] Int. Cl.³ ................... G01G 23/06; G01G 3/14; G01G 3/08

[52] U.S. Cl. ................... 177/187; 177/210 EM; 177/229

[58] Field of Search ............... 177/184, 185, 187, 189, 177/200, 210 EM, 229

[56] References Cited

U.S. PATENT DOCUMENTS

| | | | |
|---|---|---|---|
| 2,793,026 | 5/1957 | Giardino et al. | 177/185 |
| 3,322,222 | 5/1967 | Baur | 177/200 X |
| 3,493,773 | 2/1970 | Power | 177/210 EM X |
| 3,494,437 | 2/1970 | Fathauer | 177/200 |

*Primary Examiner*—George H. Miller, Jr.
*Attorney, Agent, or Firm*—Larson and Taylor

[57] ABSTRACT

A differential weighing system is provided which includes a primary suspension having an associated weigh pan for receiving a commodity to be weighed, a secondary suspension having a natural frequency matched to that of the primary suspension, and an electrical displacement transducer for producing an output in accordance with the relative displacement between the two suspensions. Damping to ground is provided for each suspension in combination with damping of the relative movement between the suspensions. The two inputs of a differential amplifier are connected to the outputs of a pair of sensing coils of the displacement transducer. A low pass filter having a cutoff frequency at or near the natural frequency of the suspensions is connected to the output of the differential amplifier.

8 Claims, 2 Drawing Figures

DIFFERENTIAL WEIGHING SYSTEM PROVIDING IMPROVED SIGNAL TO NOISE RATIO

FIELD OF THE INVENTION

The present invention relates to an apparatus for rapid weighing of charges of a commodity and, more particularly, to a weighing apparatus of this type which reduces the degradation of weighing accuracy caused by various conditions encountered in actual operation of such apparatus and which thus increases the weighing accuracy.

BACKGROUND OF THE INVENTION

The invention is particularly concerned with weighing apparatus comprising a weigh cell of the spring balance type which produces an electrical output signal proportional to weight. A number of conditions encountered during operation of such a weigh cell serve to degrade the accuracy of the weigh cell. For example, during the net or gross weight filling of commodities in the form of large pieces, the impact of the pieces, upon landing, causes undesired signals which mask or otherwise interfere with the weight signal. Similarly, vibrations transmitted to the weigh cell and electrical pick-up, e.g., switching transients, also contribute unwanted signal components to the weight signals. These unwanted signals or signal components, hereinafter referred to as noise, are superimposed upon the weight signal and thus place a limit on the smallest increment of weight that can be accurately detected by the weigh cell.

The effect of the impact of individual pieces of the commodity to be weighed upon the weighing accuracy can be readily appreciated by considering the fact that a potato chip landing edgewise upon a weigh hopper can produce a momentary signal twice as large as the same chip when landing flat upon the other chips in the weigh bucket. A large chip will weigh about $\frac{1}{8}$ oz. so that the impact caused thereby could result in a weighment which actually is $\frac{1}{8}$ oz. lighter than the weight cut-off point, because the chip in landing on its edge would be perceived by the scale as weighing $\frac{1}{4}$ oz.

The vibration problem referred to above dictates the use of slower weigh cells. To explain, a given spring suspension has the shortest settling time when the suspension is critically damped. Under these conditions the settling time is equal to one cycle of the natural frequency of the suspension. If the suspension is stiffened so as to double the natural frequency, the travel of the suspension for a given weight increment will be reduced by a factor of four. In other words, a given vibration amplitude produces a signal representing four times as much weight when the speed of response of the suspension is doubled.

Considering a specific example dealing with vibration, a 1/10 second weigh cell with a weigh hopper, moving members and a load of 62 oz., will only move 25 millionths of an inch (0.000025") when 1/64 oz. is added. However, the vibration for a conventional 1/10 second weigh cell of an automatic weighing machine will substantially exceed that corresponding to the signal associated with a weight of 1/64 oz. and thus the limitations vibrations place on the accuracy of the weigh cell are evident.

It is also noted that the vibration frequencies encountered under operating conditions vary from about 0.3 to 60 hertz (Hz), while the natural frequencies of weigh cells vary between 3 to 10 Hz. A multiple scale weighing machine can include twenty feeders which turn on and off at various times. The drive motors for the machine can produce frequencies from 20 to 30 Hz while the associated V-belts, gears and oscillating members generate a multitude of frequencies. Further, sealing jaw carriages, crank arms and former carriers generate frequencies below the natural frequencies of the weigh cells. In addition, some of the most severe vibrations are transmitted through the floor, these vibrations resulting from passing lift trucks, conveyors, vibratory product distribution systems and the like. Thus, the vibrations referred to above appear in the weight signal produced by the weigh cell as a mixture of components of varying frequencies and changing phase relationships.

The electrical pick-up noise mentioned above can be either radiated or conducted noise and the most serious is caused by voltage transients. Vibratory feeders can generate 2,000 volt transients while solenoids and relays also generate substantial transients.

As explained in more detail hereinbelow, the present invention affords substantial improvement in the ratio of the weight signal produced by a weigh cell relative to noise caused by impact, vibration and electrical pick-up, and one aspect of the invention concerns the provision of mechanical damping for this purpose. Two patents which are relevant to this aspect of the invention are U.S. Pat. No. 2,793,026 (Giardino et al.) and U.S. Pat. No. Re. 28,303 (Blodgett).

The Giardino et al. patent discloses a spring balance weighing apparatus for rapid weighing and checking operations including a pair of spring suspensions which are individually connected to a common support through respective damping mechanisms. One of the suspensions includes a scale pan and a capacitor plate is associated with each suspension. Relative movement between the plates (as occurs when the suspensions move relative to one another) causes a change in the spacing between the capacitor plates and thus a change in the output signal sensed by an associated electrical measuring instrument. The Giardino et al. patent provides an adjustment for preventing unwanted intercoupling of the two suspensions.

The Blodgett patent discloses dynamically compensated weighing scales wherein a velocity sensitive coupling is provided between a scale pan suspension and a compensator suspension. The patent also states that damping of the scale pan suspension may be desirable. The emphasis in the patent is on impact compensation and rate sensing. The subject matter of the Blodgett patent is hereby incorporated by reference.

SUMMARY OF THE INVENTION

In accordance with the invention, a weighing system is provided which affords very substantial reduction in the degradation of weight signal as compared with all known prior art weighing systems including those discussed above. In particular, the weighing system of the invention provides improvement in the ratio of the weight signal to noise caused by vibration, impact and electrical pick-up, i.e., to noise of all of the basic types encountered in weighing systems. The invention has both mechanical and electrical aspects and these aspects, in combination, provide an optimum improvement in signal to noise ratio. However, the mechanical aspect of the invention itself provides substantial improvement with respect to at least one noise category as compared with all of the prior art weighing systems tested including those of the Giardino et al. and Blodgett patents.

In accordance with a preferred embodiment of the invention, a differential weighing system is provided comprising a primary suspension including a weigh pan for receiving a commodity to be weighed, a second suspension having natural frequency which is matched to that of the primary suspension, a first damping means for damping movement of the primary suspension relative to the ground, a second damping means for damping movement of the secondary suspension relative to ground, a third damping means intercoupling the primary and secondary suspensions so as to provide damping of the relative movement between the suspensions, and displacement responsive means, responsive to the relative displacement of the two suspensions, for providing an output in accordance therewith. The provision of these three damping means in combination constitutes the so-called mechanical aspect of the invention and affords the improved results referred to above.

The electrical aspect of the invention involves the provision of an electrical signal processing circuit for processing the displacement-related output signal, the circuit comprising a differential amplifier and low pass filter. The displacement responsive means preferably comprises an electrical displacement transducer including a pair of parallel-connected sensing coils or windings located on one of the suspensions for sensing the relative displacement between the windings and a core located on the other suspension. The output of the two sensing windings are connected to the two inputs of the differential amplifier. The differential amplifier is effective in substantially reducing the noise appearing at both inputs thereof, principally electrical pick-up. The low pass filter is connected to the output of the differential amplifier and has a cutoff frequency at or above the natural frequency of the two suspensions. As explained below, while frequencies below the natural frequency of the weigh cell suspensions contain weight signal information and should not be filtered, frequencies above this natural frequency can be safely filtered out.

Other features and advantages of the invention will be set forth in, or apparent from, the detailed description of the preferred embodiments which follows.

DESCRIPTION OF THE PREFERRED EMBODIMENTS

Figure 1:
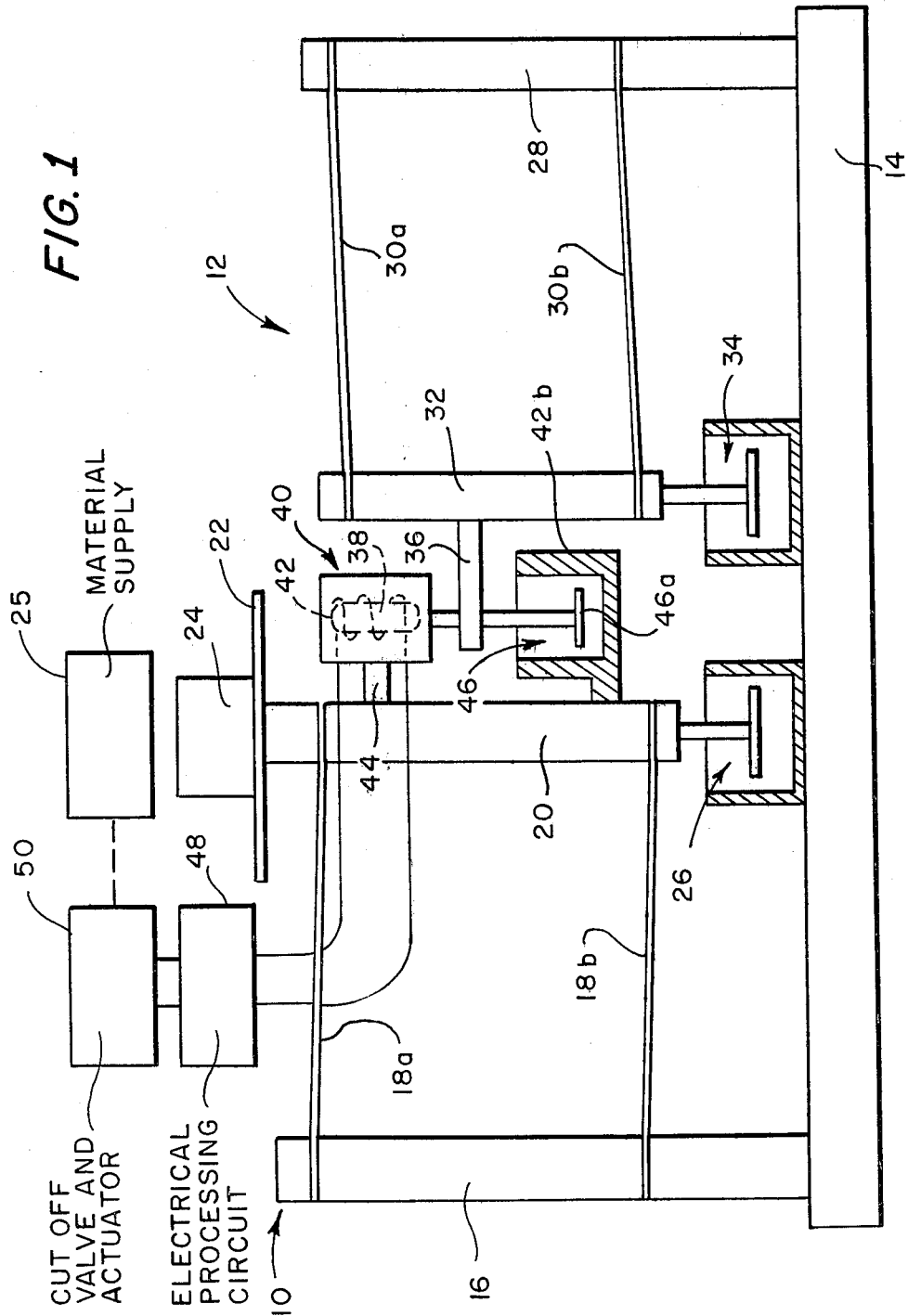
FIG. 1 is a schematic representation of a differential weigh cell constructed in accordance with the invention.

Referring to FIG. 1, a schematic representation is presented which shows the basic elements of the weighing system of the invention. As illustrated, the system comprises a primary spring suspension, generally denoted 10, and secondary spring suspension, generally denoted 12, mounted on a common base 14. The primary spring suspension 10 includes a support post or pillar 16 mounted on base 14 which is connected through flexure plates 18a and 18b to a vertically extending scale stem 20. A pan 22 mounted on stem 20 receives a hopper or receptacle 24 to which a commodity is fed from a material supply unit 25 such as a vibratory feeder. It will be understood that feeding a commodity to hopper 24 will cause a proportional linear downward displacement of scale stem 20. A damper or dashpot 26 is located at the bottom of scale stem 20 for dampening the movement thereof.

The secondary spring suspension 12 is of a similar construction and includes a support post or pillar 28 which supports a pair of flexure plates 30a and 30b connected to a vertical rod member or scale stem 32, and a dashpot 34 connected to stem 32.

A support arm 36 attached to stem 32 serves to mount a core member 38 which forms part of a low voltage displacement transducer (LVDT) 40 described in more detail below. A coil 42 is supported by a support arm 44 associated with scale stem 20 of primary spring suspension 10. In general, core 38 and coil 42 are disposed and coil 42 is connected so that any relative movement between the two results in a corresponding output signal which is supplied to an electrical processing circuit 48 which controls the operation of a cut-off valve and actuator, denoted 50, for material supply 25.

The piston 46a of dashpot 46 is also connected to support arm 36 while cylinder 46b of dashpot 46 is secured to scale stem 20. Dashpot 46 is intended to illustrate a representation of a damping connection between the primary and secondary spring suspensions and other forms of damping known in the art can be used.

The natural frequencies of the spring suspensions 10 and 12 are chosen so as to be as nearly identical as possible. The LVDT 40 will, as noted above, provide an output signal (or change in a constant output signal) only when one suspension moves relative to the other and will not provide an output signal (or change in the output signal) for movements wherein both suspensions are displaced an equal amount relative to ground. In theory, there will be no relative movement between the two suspensions and thus no change in signal when the mounting plate 14 is vibrated. However, in practice, perfect damping and matching of the natural frequencies of the suspensions is not possible because the natural frequency and damping of the primary suspension 10 changes with the weight applied thereto. On the other hand, this general approach of matching and damping of the two suspensions has provided an improvement of a factor of twenty in the signal to noise ratio over conventional weighing systems of this general type.

The dashpot or damping coupling 46 between the two suspensions provides a further improvement over conventional systems. A dashpot coupling is a velocity sensitive coupling and when the primary suspension 10 is moved slowly, as when weight is added during a filling operation, the coupling dashpot 46 will transmit very little force to the secondary suspension 12. On the other hand, when the primary suspension 10 is driven faster than the natural frequency thereof, such as occurs during the overshoot period due to the impact of pieces of a commodity landing on the primary suspension, the coupling is much stiffer, i.e., offers substantially increased resistance. The increase in stiffness causes movement of the secondary suspension 12 and thereby reduces the relative movement between the two suspensions which, in turn, reduces the magnitude of the overshoot signal generated by the LVDT 40. The use of the intercoupling dashpot 46 also reduces the relative motion between the two suspension which is caused, as discussed above, by the unavoidable mismatch in natural frequencies and damping between the two suspensions.

Although the mechanical construction depicted in FIG. 1 provides a substantial improvement in signal to noise ratio, i.e., in the ratio between the weight signal and the noise signal produced by vibration, impact and the like, the resultant output weight signal will still contain some vibration and impact noise components as well as noise components due to electrical pick-up. As discussed above, a second aspect of the invention concerns reducing the remaining noise and involves the electrical processing circuit 48.

Figure 2:
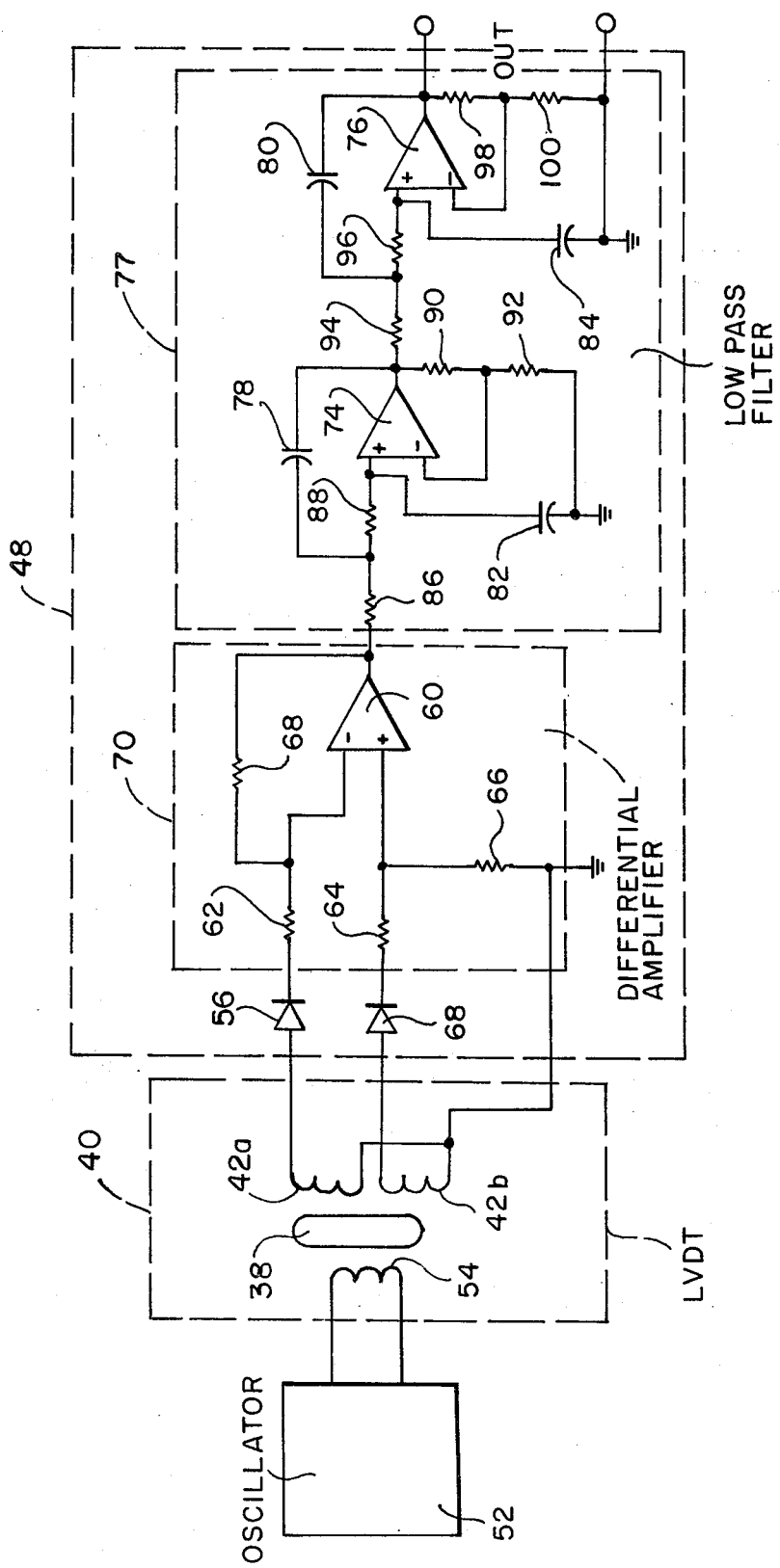
FIG. 2 is a schematic circuit diagram of the displacement transducer of FIG. 1 in combination with electrical signal processing circuitry of the invention.

Referring to FIG. 2, a schematic circuit diagram of the electrical processing circuit indicated by block 48 in FIG. 1 is shown together with a schematic circuit diagram of electrical displacement transducer 40. Considering the latter first, an oscillator 52 supplies an a.c. input voltage to a primary coil or winding 54 of LVDT 40. Coil 54 is fixed to the primary suspension together with a pair of parallel-connected secondary windings or coils 42a and 42b which form coil 42 of FIG. 1. Core 38 causes a voltage to be induced in the windings 42a and 42b. Relative movement of core 38 and secondary windings 42a, 42b results in a change in the signal induced in the secondary windings.

The signal processing circuit 48 includes pair of diodes 56 and 58 which serve to rectify signals from the secondary windings 42a and 42b of LVDT 40. The rectified signals are fed to the inverting and non-inverting inputs of an operational amplifier 60 which, together with suitable resistors 62, 64, 66 and 68, form a differential amplifier circuit 70. The output of differential amplifier 70 is representative of the difference between the two input signals and is thus proportional to the relative movement between the weigh cell suspensions 10,12. As noted above, when core 38 is stationary relative to secondary windings 42a, 42b, there is no change in the output signal. Further, although a change in the output signal will be produced for relative movement of the suspensions in either direction, of basic concern is the relative downward movement of the primary suspension 10 such as occurs when hopper 24 is filled. In any event, noise appearing at both inputs of operational amplifiers will be reduced about 1000 times at the output. This noise is primarily electrical pick-up noise.

The output of differential amplifier circuit 70 is connected to the input of a multi-section fourth order active low pass filter 72. Filter 72 includes a pair of series connected operational amplifiers 74 and 76, a first pair of capacitors 78 and 80 each connected between the output and one input of the associated operational amplifier, a second pair of capacitors 82 and 84 connected between that same input of the associated operational amplifier and ground, and eight resistors 86, 88, 90, 92, 94, 96, 98 and 100, connected as shown. The cut-off frequency of filter 72 is at or slightly above the natural frequencies of the weigh cell suspensions. Frequencies higher than the natural frequency of the weigh cell can be safely filtered out of the input signal from differential amplifier 72 because this portion of the frequency spectrum does not contain useful information. However, frequencies below the natural frequency of the weigh cell should not be filtered because noise at these frequencies cannot be distinguished from the weight signal. In addition, low frequency filtering slows down the response time of the overall system.

As stated above, the weighing system of the present invention provides substantially improved results as compared with all of the prior systems discussed above. Tests have been conducted comparing the mechanical aspects of the system of the present invention with respect to (i) conventional basic spring suspension systems, (ii) the system of the Blodgett patent and (iii) the system of the Giardino patent for (a) 60 cycle vibration as caused by a vibratory feeder; (b) impact noise (the dropping of a steel ball); (c) the noise (vibration) of a 370 rpm shaft with an eccentric load; and (d) the noise (vibration) caused by a motor and countershaft with V belts driving it. The results of these tests indicate a reduction in the effects of both impact noise and 60 cycle vibration as compared with the Giardino system, a reduction in the effects of 60 cycle vibration, 370 rpm noise, and motor noise as compared with the Blodgett system and a reduction in all categories with respect to conventional systems. Further, with the addition of the electrical signal processing aspect of the invention, the combination provides improved results in all categories as compared with all systems. In fact, these tests show that the effects of noise in all four categories were almost entirely eliminated.

It is noted that in FIG. 2, the two suspensions face each other; it will be appreciated that other arrangements are possible and that, for example, the two suspensions can be arranged in line or stacked relationship.

Although the invention has been described in relation to exemplary embodiments thereof, it will be understood by those skilled in the art that variations and modifications can be effected in these exemplary embodiments without departing from the scope and spirit of the invention.

I claim:

1. A differential weighing system comprising a primary suspension including a weight supporting means, a secondary suspension having a natural frequency substantially matched to that of the primary suspension, first damping means for damping movement of the primary suspension relative to ground, second damping means for damping movement of the secondary suspension relative to ground, a third damping means for intercoupling the primary and secondary suspensions so as to provide damping of relative movement between the primary and secondary suspensions, and displacement responsive means, responsive to the relative displacement between the primary and secondary suspensions, for producing an output in accordance therewith.

2. A system as claimed in claim 1 further comprising electrical means for processing the output of said displacement responsive means, said electrical means including a low pass filter whose cut off frequency is located at or above the natural frequency of said suspensions.

3. A system as claimed in claim 1 or claim 2 wherein said displacement responsive means comprises an electrical displacement transducer including a core mounted on one of said suspensions and a cooperating coil mounted on the other of said suspensions.

4. A system as claimed in claim 1 further comprising electrical processing means for processing the output of said displacement responsive means, said displacement responsive means including a pair of sensing coils mounted on one of said suspensions for sensing the relative displacement between said suspensions and said electrical signal processing means including a differential amplifier having a pair of inputs respectively connected to said pair of coils.

5. A system as claimed in claim 4 wherein said electrical signal processing means further comprises a low pass filter connected to the output of said differential amplifier and have a cutoff frequency at least as high as the natural frequency of said suspensions.

6. A system as claimed in claim 4 or claim 5 wherein a diode rectifier is connected between the inputs of said differential amplifier and said sensing coils.

7. A system as claimed in claim 1 wherein said third damping means comprises a dashpot having a piston connected to one of the suspensions and a cylinder mounted on the other of the suspensions, said first and second damping means comprising further dashpots connected between the respective suspensions and a common ground plate.

8. In a differential weighing system comprising a primary suspension including means for receiving a commodity to be weighed, a secondary suspension having a natural frequency matched to that of the primary suspension, damping means for damping the movement of the said primary and secondary suspensions relative to ground, and electrical displacement responsive means, responsive to the relative displacement between said suspensions, for producing an electrical output signal in accordance with said relative displacement of said suspensions, the improvement wherein an electrical signal processing circuit is provided for processing said electrical output signal, said electrical signal processing circuit comprising a differential amplifier having a pair of inputs for receiving a said electrical output signal at said inputs, and a low pass filter connected to the output of said differential amplifier and having a cut off frequency at or above the natural frequency of said suspensions.

* * * * *